United States Patent [19]

Ohmi et al.

[11] Patent Number: 4,525,189
[45] Date of Patent: Jun. 25, 1985

[54] PROCESS FOR PRODUCING GLASS PRODUCT HAVING GRADIENT OF REFRACTIVE INDEX

[75] Inventors: Shigeaki Ohmi, Tokorozawa; Seiichi Shingaki; Hiroyuki Sakai, both of Akishima; Yoshiyuki Asahara, Higashiyamato, all of Japan

[73] Assignee: Hoya Corporation, Tokyo, Japan

[21] Appl. No.: 488,809

[22] Filed: Apr. 26, 1983

[30] Foreign Application Priority Data

May 14, 1982 [JP] Japan .................. 57-80124

[51] Int. Cl.$^3$ .............................. C03C 15/02
[52] U.S. Cl. ........................ 65/3.15; 65/31
[58] Field of Search ............. 65/3.15, 31; 501/12

[56] References Cited

U.S. PATENT DOCUMENTS 3,938,974  2/1976  Macedo et al. .............. 65/3.15
4,110,093  8/1978  Macedo et al. .............. 65/31
4,110,096  8/1978  Macedo et al. ............ 65/31 X
4,225,330  9/1980  Kakuzen et al. ........... 65/31 X
4,389,233  6/1983  Kurosaki et al. ............. 65/31

FOREIGN PATENT DOCUMENTS 2084990  4/1982  United Kingdom .

Primary Examiner—William Smith
Assistant Examiner—Michael K. Boyer
Attorney, Agent, or Firm—Oblon, Fisher, Spivak, McClelland & Maier

[57] ABSTRACT

A process for producing a glass product having $\Delta n$, the difference between the central and peripheral portions of the glass, greater than 0.04. This process utilizes a porous glass body which is produced via a phase separation technique. A dopant selected from the group consisting of (1) $TlNO_3$, (2) $TlNO_3$ and an alkali metal compound and (3) $TlNO_3$, $Pb(NO_3)_2$ and an alkali metal compound is then permeated into the micropores of the porous glass product. A concentration gradient of the dopant is then formed by leaching out a portion of the dopant from the micropores. After the dopant is solidified in the micropores, the porous glass product is dried. A heat-treatment step then serves to collapse the micropores. A glass product having a gradient of refractive indices is thereby obtained.

7 Claims, No Drawings

PROCESS FOR PRODUCING GLASS PRODUCT HAVING GRADIENT OF REFRACTIVE INDEX

FIELD OF THE INVENTION

The present invention relates to a process for producing a glass product having a gradient of refractive indices which can be used as a material (preform) for optical transmission fibers or as a material for rod lenses.

BACKGROUND OF THE INVENTION

A molecular stuffing method is known as a process for producing a glass product having a gradient of refractive indices in which a porous glass is used and its pores are filled with dopants (refractive index correction components).

Japanese Patent application laid open on Nov. 1, 1976, (OPI) No. 126207/76 (the term "OPI" as used herein refers to a "published unexamined Japanese patent application") describes a process for producing a glass product having a gradient of refractive indices by the molecular stuffing method, as well as a process for producing a porous glass. According to the process, a borosilicate glass is subjected to a heat treatment at a prescribed condition to separate it into an $SiO_2$-rich phase and an alkali metal oxide and $B_2O_3$-rich phase (phase separation). The glass is then treated with an aqueous solution containing an acid such as hydrochloric acid, sulfuric acid, or nitric acid, to leach the alkali metal oxide and $B_2O_3$-rich acid-soluble phase, thereby forming a porous glass having continuous micropores which has the $SiO_2$-rich phase as a skeleton. After allowing a solution of dopants to permeate into the micropores present in the porous glass thus prepared (stuffing), a part of the dopants is leached out from the outside of the glass product (unstuffing) to form a gradient of dopant concentration. The dopants are then solidified in the pores and the glass product is dried and subjected to a heat treatment to collapse the micropores, thereby obtaining a glass product having a gradient of refractive indices. Oxides nitrates, carbonates, acetates, phosphates, borates, arsenates and silicates of alkali metals, alkaline earth metals, boron, aluminum, lead, phosphorus, and the like are described as examples of dopant.

A transparent glass product having a gradient of refraction is used as rod microlenses for microlens arrays, pickup lenses for optical video or audio disks, and the like. Rod microlenses used for rod microlens arrays of copying machines must have a $\Delta n$ (difference of refractive index between central and peripheral portions of the lens) of only from about 0.007 to about 0.008. Therefore, the glass product obtained by the molecular stuffing method can sufficiently meet the requirement. However, lens arrays for facsimile and lens arrays for LED printers which are required to have a large numerical aperture and which are bright must have a $\Delta n$ value exceeding 0.04 to 0.03, respectively. Therefore, a glass product satisfying this requirement cannot be obtained by merely utilizing the molecular stuffing method.

In order to increase the $\Delta n$ by the molecular stuffing method, the concentration of dopants in the stuffing solution must be increased or a dopant having a high refractive index must be used. However, the concentration of dopants in the stuffing solution cannot be increased infinitely due to the limit of their solubility. For example, $CsNO_3$, which is often used as a dopant, has a solubility at 100° C. of at most 200 g/100 ml $H_2O$. Accordingly, even if a saturated solution of $CsNO_3$ is used as a stuffing solution, no significant effect can be expected to increase the $\Delta n$. In fact, Japanese Patent Application (OPI) No. 126207/76 shows examples which produce a glass product having a gradient of refractive indices by stuffing a $CsNO_3$ aqueous solution containing 120 g of $CsNO_3$ per 100 ml of water at a temperature of 95° C. wherein the maximum value for value $\Delta n$ is merely 0.031. A glass product having such a $\Delta n$ value cannot be used in lens arrays for facsimile machines.

Regarding the use of dopants having a high refractive index, viz., dopants other than alkali metal compounds, even if those can be used for stuffing into the pores in a porous glass product, such dopants tend to react with the glass during heat treatment of the porous glass product, thereby making the glass product unstable. For example, $Pb(NO_3)_2$ is known as a dopant to increase the refractive index and has a solubility of about 130 g/100 ml $H_2O$ at 100° C. Even if this is used for the stuffing of a porous glass, the porous glass becomes unstable during the heat treatment and a transparent glass product is hardly obtained. Accordingly, when a dopant having a high refractive index is used, the amount used thereof must be limited to the range where a transparent glass product can be obtained. In the case of $Pb(NO_3)_2$, the concentration of the stuffing solution is at most about 40 g/100 ml $H_2O$ and even if the stuffing is conducted with such a concentration, the refractive index at the central portion of the resulting glass product is at best 1.465, as is described in Japanese Patent Application (OPI) No. 126207/76.

SUMMARY OF THE INVENTION

It has been found that a glass product having a large gradient of refractive indices can be obtained by using thallium nitrate ($TlNO_3$) as a dopant in the molecular stuffing method due to its high solubility in water.

It has also been found that the production of a white turbid, opaque glass product due to the use of thallium can be effectively prevented by the use of an alkali metal compound in combination with $TlNO_3$ even if a large amount of a thallium component is present in a glass product.

It has been further found that $TlNO_3$ can be used together with $Pb(NO_3)_2$ which is conventionally known as a dopant for increasing a refractive index.

Accordingly, an object of the present invention is to provide a method of producing a glass product having a gradient of refractive indices which comprises the steps of:

stuffing a solution of a dopant selected from the group consisting of (1) $TlNO_3$, (2) $TlNO_3$ and an alkali metal compound, and (3) $TlNO_3$, $Pb(NO_3)_2$ and an alkali metal compound into micropores of a porous glass product;

unstuffing a part of the dopant in the micropores with or without solidifying the dopant in the micropores to form a prescribed gradient of refractive indices in the porous glass product;

solidifying the dopant in the micropores;

drying the porous glass product; and heat treating the porous glass product to collapse the micropores.

DETAILED DESCRIPTION OF THE INVENTION $TlNO_3$ has an extremely high solubility in water. As a result, where $TlNO_3$ is used as a dopant, $TlNO_3$ can be stuffed in a porous glass product in a high concentration. However, where $TlNO_3$ is used alone as a dopant, if the solution having a high concentration of more than 80 g/100 ml $H_2O$ is stuffed, the glass becomes white turbid during the heat treatment and a transparent product cannot be obtained. Therefore, when $TlNO_3$ is used alone as a dopant, the amount (concentration) of $TlNO_3$ is 80 g/100 ml $H_2O$ or less, preferably 60 to 80 g/100 ml $H_2O$.

On the other hand, where $TlNO_3$ is used together with an alkali metal compound such as $CsNO_3$ as a dopant, even if $TlNO_3$ is stuffed in a high concentration, it is possible to effectively prevent the glass product from becoming white turbid and opaque and a transparent glass product can be obtained. When $TlNO_3$ is used together with an alkali metal compound, the amount of $TlNO_3$ is preferably 100 to 400 g/100 ml $H_2O$, and the amount of the alkali metal compound is 20 g/100 ml $H_2O$ or more, preferably 100 to 200 g/100 ml $H_2O$.

Further, where $TlNO_3$ is used together with $Pb(NO_3)_2$ and an alkali metal compound such as $CsNO_3$ as a dopant, it is also possible to effectively prevent the glass product from becoming white turbid and opaque, and a transparent glass product can be obtained. When $TlNO_3$ is used together with $Pb(NO_3)_2$ and the alkali metal compound, the amount of $TlNO_3$ is preferably 100 to 400 g/100 ml $H_2O$, the amount of $Pb(NO_3)_2$ is 20 g/100 ml $H_2O$ or more, preferably 80 to 120 g/100 ml $H_2O$, and the amount of the alkali metal compound is 20 g/100 ml $H_2O$ or more, preferably 100 to 200 g/100 ml $H_2O$.

Further, examples of the alkali metal compound which can be used in combination with $TlNO_3$ in the present invention include for example, nitrates, and carbonates, of Na, and K.

Examples of the solvent which dissolves the dopant according to the invention include water, an organic solvent such as methanol or ethanol, or a mixture of the organic solvent and water.

Any solvent which can be used as the solvent for the dopant can be used for the unstuffing.

The present invention is described in greater detail by reference to the following examples although the present invention is not to be construed as being limited thereto. Unless otherwise indicated, all percents are by weight.

EXAMPLES

A glass composed of 54.50% $SiO_2$, 34.30% $B_2O_3$, 5.20% $Na_2O$ and 6.00% $K_2O$ was melted at 1,450° C. for 3 hours while stirring it about 1 hour during melting. The molten glass was casted into a mold, at 580° C. for 1 hour, and gradually cooled in a furnace to give a glass block. A glass rod having a diameter of 3 mm and a length of 60 mm was produced by cutting the block and was subjected to a heat treatment at a temperature of 540° C. for 120 hours to cause a phase separation. The resulting phase-separated rod was treated in 1.5N $H_2SO_4$ aqueous solution at 100° C. for 12 to 24 hours to give a porous glass rod.

The porous glass rod was immersed in an aqueous solution containing 120 g of $CsNO_3$ and 200 g of $TlNO_3$ per 100 ml of water at 100° C. for 24 hours to effect stuffing, and then immersed in an ethanol aqueous solution (40% by volume) at 70° C. for 20 minutes to effect unstuffing. The thus treated rod was immersed in a methanol solution at 0° C. for 2 hours to solidify the dopant in the micropores and dried in a desiccator for 2 hours. Thereafter, the rod was maintained at 920° C. for 6 hours and the micropores were collapsed to obtain a transparent glass product.

The above procedures were followed except that the type and amount of the dopant were changed as shown in the table below to obtain glass rods. The refractive index of each glass rod was measured.

The results obtained are shown in the table below.

TABLE

| Example Nos. | Amount of Dopant (in 100 ml of $H_2O$) | | | Refractive Index | | Appearance |
| --- | --- | --- | --- | --- | --- | --- |
| | $CsNO_3$ (g) | $Pb(NO_3)_2$ (g) | $TlNO_3$ (g) | Central Portion | Peripheral Portion | |
| Example 1 | 120 | — | 200 | 1.530 | 1.463 | Transparent |
| Example 2 | — | — | 80 | 1.496 | 1.463 | Transparent |
| Example 3 | — | — | 100 | 1.500 | 1.463 | White turbid |
| Example 4 | 120 | — | 100 | 1.512 | 1.463 | Transparent |
| Example 5 | 120 | 100 | 100 | 1.536 | 1.463 | Transparent |
| Example 6 | 200 | — | 100 | 1.524 | 1.463 | Transparent |
| Example 7 | 120 | — | 300 | 1.548 | 1.463 | Transparent |
| Example 8 | 200 | — | 400 | 1.569 | 1.463 | Transparent |
| Comparative Example 1 | 190 | — | — | 1.486 | 1.464 | Transparent |
| Comparative Example 2 | — | 70 | — | — | — | White turbid |
| Comparative Example 3 | — | 40 | — | 1.465 | — | Transparent |

While the invention has been described in detail and with reference to specific embodiments thereof, it will be apparent to one skilled in the art that various changes and modifications can be made therein without departing from the spirit and scope thereof.

What is claimed as new and desired to be secured by Letters Patent of the United States is:

1. A process for producing a glass product having a gradient of refractive indices which comprises:
   (a) producing a porous glass body by:
      (1) heating a glass body to effectuate a phase separation;
      (2) leaching out the acid-soluble phase from said glass body; and then
      (3) recovering therefrom the porous glass body;
   (b) permeating a solution of dopant comprising $TlNO_3$ and an alkali metal nitrate into the micropores of said porous glass product wherein the concentration of said $TlNO_3$ is between 100 to 400 g/100 ml of $H_2O$ the concentration of said alkali metal nitrate is at least 20 g/100 ml of water;
   (c) leaching out a portion of the dopant from the micropores with or without solidifying the dopant in the micropores to form a concentration gradient of the dopant in said porous glass product, (d) solidifying the dopant in the micropores, (e) drying the porous glass product, (f) heat treating said porous glass product to collapse the micropores, and (g) recovering a glass product having $\Delta n$ greater than 0.04 wherein $\Delta n$ is the difference between the central and peripheral portions of the glass.

2. The process of claim 1, wherein the alkali metal nitrate is $CsNO_3$.

3. The process of claim 1, wherein a solvent for the dopant is selected from the group consisting of water, an organic solvent, and a mixture of water and organic solvent.

4. The process of claim 1 wherein the concentration of said alkali metal nitrate is between 100 to 200 g/100 ml of $H_2O$.

5. The process of claim 1, wherein said dopant further comprises $Pb(NO_3)_2$.

6. The process of claim 5, wherein the concentration of said $Pb(NO_3)_2$ is at least 20 g/100 ml of $H_2O$.

7. The process of claim 6, wherein the concentration of said $Pb(NO_3)_2$ is between 80 to 120 g/100 ml of $H_2O$, and the concentration of said alkali metal nitrate is between 100 to 200 g/100 ml of $H_2O$.

* * * * *